(12) United States Patent
Hafner et al.

(10) Patent No.: US 7,991,665 B2
(45) Date of Patent: Aug. 2, 2011

(54) MANAGING INCENTIVES FOR ELECTRIC VEHICLE CHARGING TRANSACTIONS

(75) Inventors: James Lee Hafner, San Jose, CA (US); Melissa Wiltsey O'Mara, Tully, NY (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/139,575

(22) Filed: Jun. 16, 2008

(65) Prior Publication Data

US 2009/0313104 A1    Dec. 17, 2009

(51) Int. Cl.
*G06Q 40/00* (2006.01)
(52) U.S. Cl. .................... 705/35; 705/14.11; 705/39
(58) Field of Classification Search ............ 705/14.13, 705/14.14, 14.11, 35, 39
See application file for complete search history.

(56) References Cited

U.S. PATENT DOCUMENTS

| | | | |
|---|---|---|---|
| 4,389,608 A | 6/1983 | Dahl et al. | |
| 4,433,278 A | 2/1984 | Lowndes et al. | |
| 4,532,418 A | 7/1985 | Meese et al. | |
| 5,422,624 A | 6/1995 | Smith | |
| 5,563,491 A | 10/1996 | Tseng | |
| 6,067,008 A | 5/2000 | Smith | |
| 6,081,205 A | 6/2000 | Williams | |
| 6,234,932 B1 | 5/2001 | Kuroda et al. | |
| 6,252,380 B1 | 6/2001 | Koenck | |
| 6,301,531 B1 | 10/2001 | Pierro et al. | |
| 6,307,349 B1 | 10/2001 | Koenck et al. | |
| 6,373,380 B1 | 4/2002 | Robertson et al. | |
| 6,456,041 B1 | 9/2002 | Terada et al. | |
| 6,727,809 B1 | 4/2004 | Smith | |
| 6,766,949 B2 | 7/2004 | Terranova et al. | |
| 6,789,733 B2 | 9/2004 | Terranova et al. | |
| 6,850,898 B1 | 2/2005 | Murakami et al. | |
| 7,402,978 B2 | 7/2008 | Pryor | |

(Continued)

FOREIGN PATENT DOCUMENTS

JP    2001359203 A    12/2001

OTHER PUBLICATIONS

State Unveils Plan to Help Drivers Recharge Their Electric Vehicles Brooks, Nancy Rivera. Los Angeles Times. Los Angeles, Calif.: Aug. 29, 1998. p. D1.*

(Continued)

*Primary Examiner* — Lalita M Hamilton
(74) *Attorney, Agent, or Firm* — Yee & Associates, P.C.; David A. Mims, Jr.

(57) ABSTRACT

A computer implemented method, apparatus, and computer program product for automatically managing incentives associated with an electric vehicle charging transaction is provided. Incentives are received from a set of sources to form received incentives, by an incentive service. Applicable incentives are selected from the received incentives based on an identification of an electric vehicle, a charging station, and a set of principals associated with the electric vehicle charging transaction, by the incentive service. A set of selected incentives is identified from the received incentives for utilization in the electric vehicle charging transaction. The set of selected incentives is sent to an energy transaction planner, wherein the energy transaction planner incorporates the set of selected incentives into an energy transaction plan that is used to control the electric vehicle charging transaction.

20 Claims, 8 Drawing Sheets

U.S. PATENT DOCUMENTS

| | | |
|---|---|---|
| 7,693,609 B2 | 4/2010 | Kressner et al. |
| 2002/0064258 A1 | 5/2002 | Schelberg, Jr. et al. |
| 2003/0153278 A1 | 8/2003 | Johnson, Jr. |
| 2003/0205619 A1 | 11/2003 | Terranova et al. |
| 2004/0265671 A1 | 12/2004 | Chipchase et al. |
| 2005/0044245 A1 | 2/2005 | Hoshina |
| 2006/0182241 A1 | 8/2006 | Schelberg, Jr. et al. |
| 2006/0282381 A1 | 12/2006 | Ritchie |
| 2006/0287783 A1* | 12/2006 | Walker ............................ 701/29 |
| 2007/0126395 A1 | 6/2007 | Suchar |
| 2007/0282495 A1* | 12/2007 | Kempton et al. ................ 701/22 |
| 2008/0039979 A1* | 2/2008 | Bridges et al. ................. 700/292 |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek et al. |
| 2008/0155008 A1 | 6/2008 | Stiles et al. |
| 2008/0281663 A1 | 11/2008 | Hakim et al. |
| 2009/0021213 A1 | 1/2009 | Johnson |
| 2009/0030712 A1 | 1/2009 | Bogolea et al. |
| 2009/0043519 A1 | 2/2009 | Bridges et al. |
| 2009/0066287 A1* | 3/2009 | Pollack et al. ................. 320/101 |
| 2009/0076913 A1* | 3/2009 | Morgan ........................... 705/14 |
| 2009/0082957 A1 | 3/2009 | Agassi et al. |
| 2009/0092864 A1 | 4/2009 | McLean et al. |
| 2009/0144001 A1 | 6/2009 | Leonard et al. |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek et al. |
| 2010/0017045 A1* | 1/2010 | Nesler et al. .................. 700/296 |
| 2010/0169008 A1 | 7/2010 | Niwa et al. |

OTHER PUBLICATIONS

Gas-Free Nation Sarah Wildman. New York Times Magazine. New York: Apr 20, 2008. p. 69, 1 pgs.*
USPTO office action for U.S. Appl. No. 12/194,290 dated Jun. 4, 2010.
U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,561, filed Jun. 16, 2008, Hafner et al.
USPTO office action for U.S. Appl. No. 12/194,210 dated Nov. 22, 2010.
USPTO office action for U.S. Appl. No. 12/194,341 dated Mar. 25, 2011.
USPTO final office action for U.S. Appl. No. 12/194,210 dated Mar. 25, 2011.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.

* cited by examiner

MANAGING INCENTIVES FOR ELECTRIC VEHICLE CHARGING TRANSACTIONS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for requesting, receiving, managing, selecting, and applying incentives associated with electric vehicle charging transactions.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, bio-diesel powered engines, ethanol powered engines, solar powered generators, and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment of the present invention, a computer implemented method, apparatus, and computer program product is provided for automatically managing incentives associated with an electric vehicle charging transaction. Incentives are received from a set of sources to form received incentives, by an incentive service. Applicable incentives are selected from the received incentives based on an identification of an electric vehicle, a charging station, and a set of principals associated with the electric vehicle charging transaction, by the incentive service. A set of selected incentives is identified from the received incentives for utilization in the electric vehicle charging transaction. The set of selected incentives is sent to an energy transaction planner, wherein the energy transaction planner incorporates the set of selected incentives into an energy transaction plan that is used to control the electric vehicle charging transaction.

DETAILED DESCRIPTION OF THE INVENTION

Figure 1:
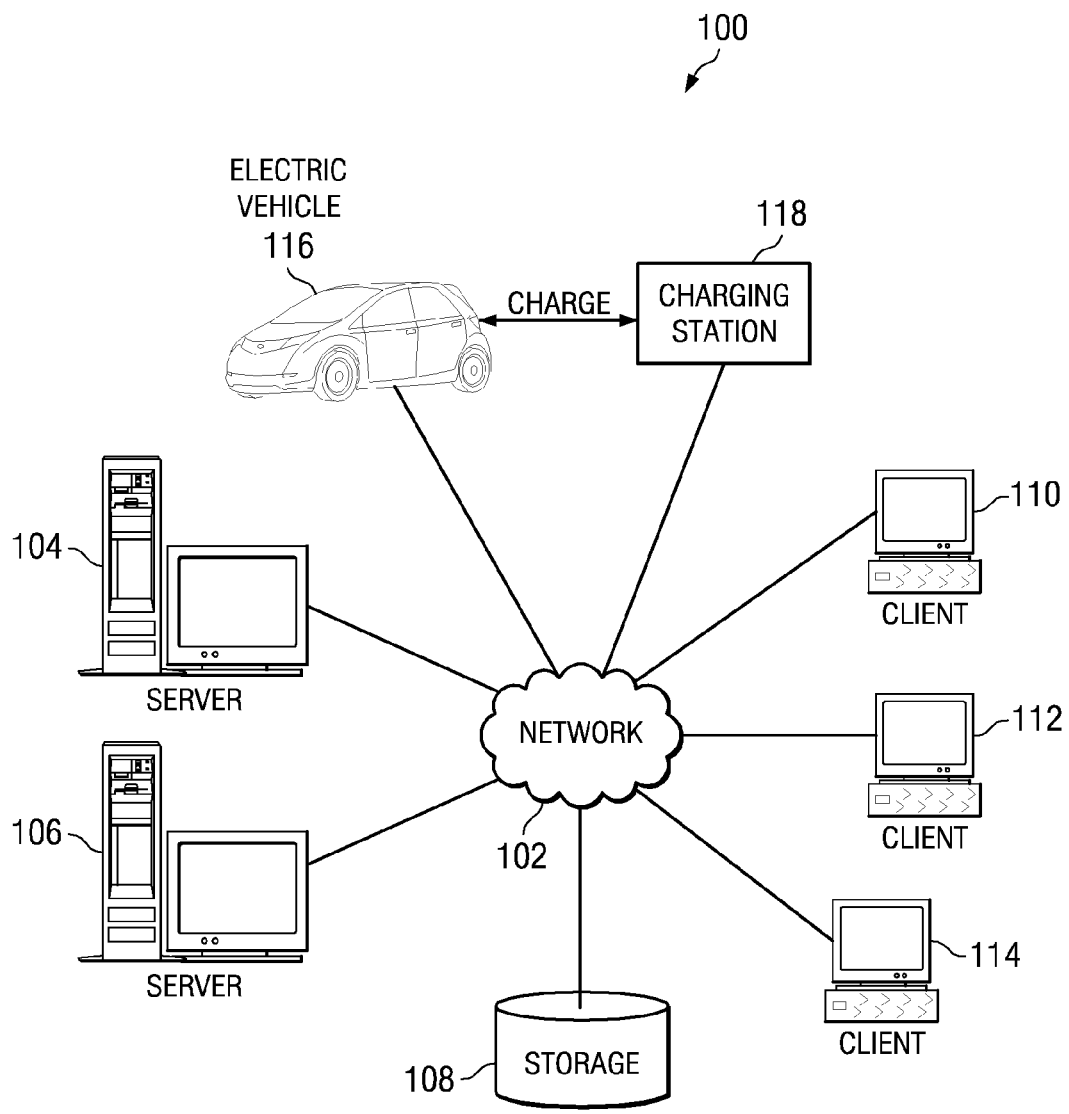
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
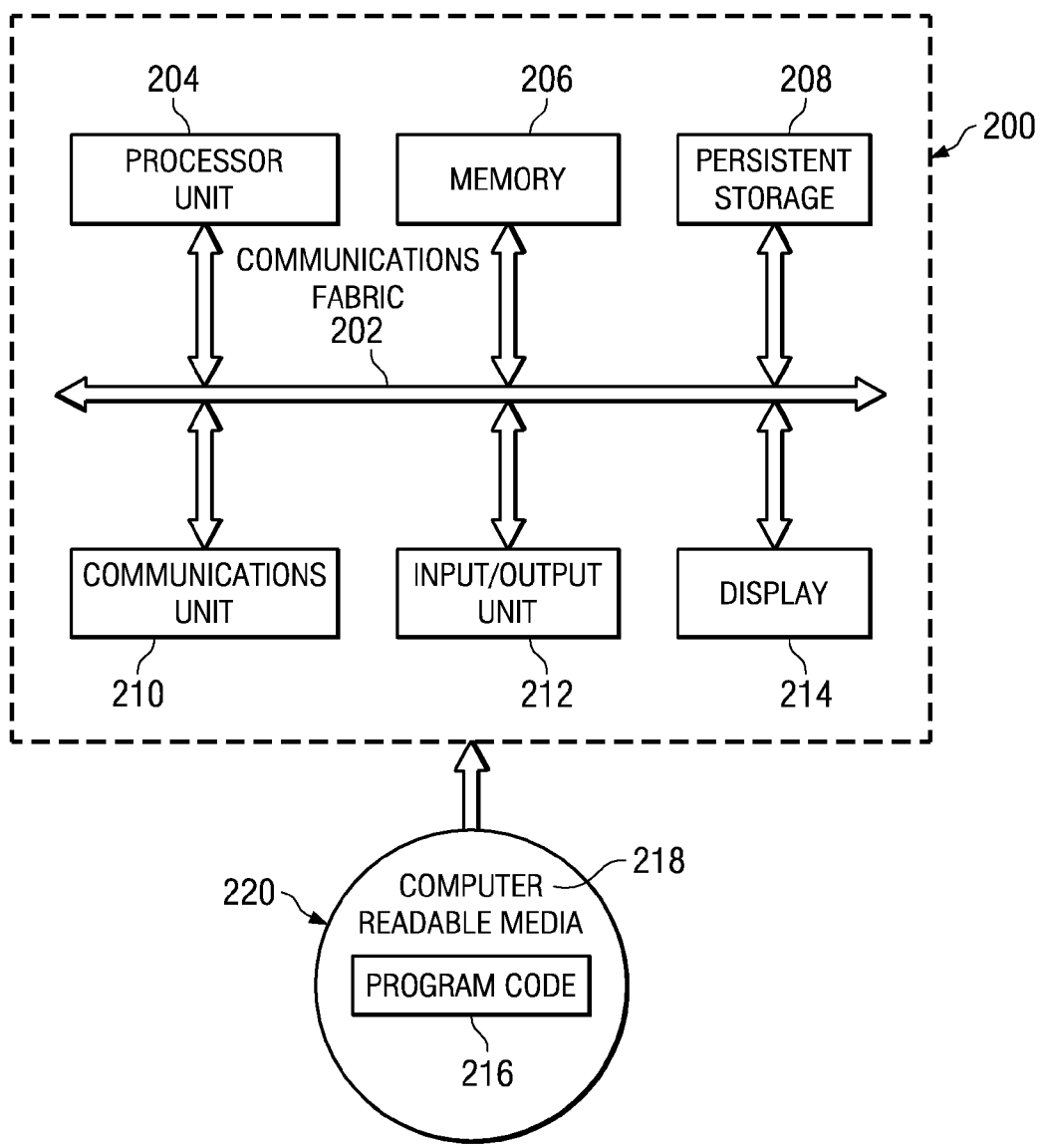
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole, or in part, to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism such as, but without limitation, solar power electric generators, gasoline powered electric generators, biodiesel powered electric generators, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. In other words, electric charge may flow from an electric grid through charging station 118 to electric vehicle 116 or the electric charge may flow from electric vehicle 116 back into the electric grid through charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user. The information may be presented in a visual or graphical format on a display, in an audio format, presented as a combination of audio and visual content, presented in a raised format that can be read by the blind, or in any other format.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, a charging plan is generated and all parties are presented with the conditions governing the charging transaction. During the charging phase, electricity flows to, from, or is stored in the electric vehicle. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
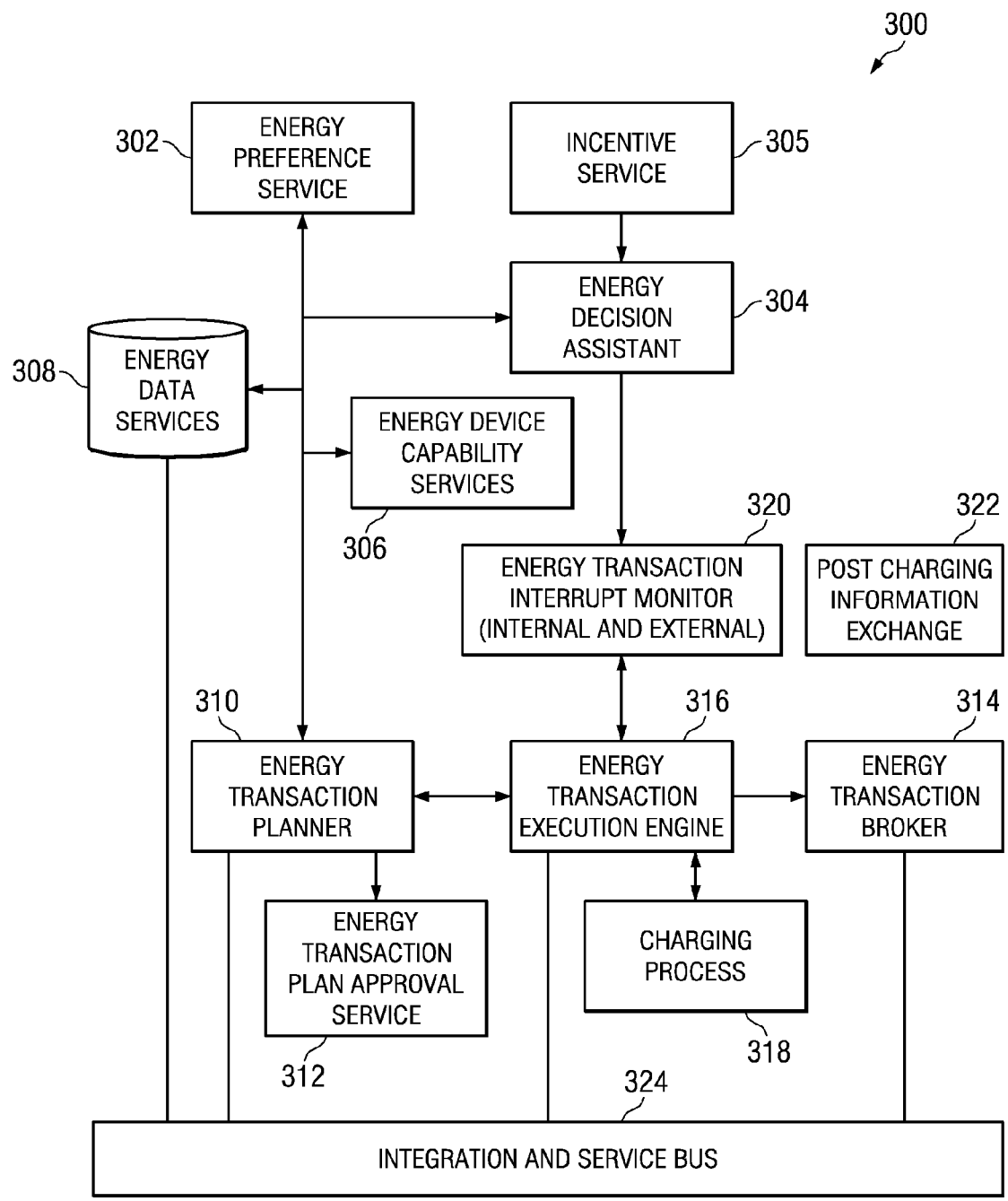
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions which are presented in standard formats which are universally understood and which can be readily communicated and agreed upon by all parties.

During the pre-charge phase, electric vehicle energy transaction infrastructure 300 utilizes energy preference service 302, energy decision assistant 304, incentive service 305, energy device capability services 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip. Energy decision assistant 304 may also serve as a source of incentives. Energy decision assistant 304 may receive incentives from one or more third parties and process the incentives prior to sending the incentives to incentive service 305. Processing the incentives includes, without limitation, filtering the incentives, sorting the incentives, and/or prioritizing the incentives. Filtering the incentives may include identifying incentives that are still valid and discarding incentives that are expired. Incentives may be valid, without limitation, on a particular time of day, date, at a particular location, or by a particular type of customer, such as a first time customer, senior citizen, child under the age of twelve, or a customer rewards member.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 305 provides information describing current incentives to energy transaction planner 310. In one embodiment, incentives service 305 provides the information describing the incentives to energy decision assistant 304. Energy decision assistant 304 then provides the incentives information to energy transaction planner 310. Energy decision assistant 304 may process the incentives prior to sending the incentives to energy transaction planner 310. Processing the incentives may include, without limitation, filtering, sorting, and/or prioritizing the incentives. The energy decision assistant 304 may maintain a history of incentives received for later analysis and/or filtering.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction. If approval is required, energy transaction planner 310 sends the transaction plan to energy transaction plan approval service 312. If energy transaction plan approval service 312 sends an approval back to energy transaction planner 310, the transaction plan is an approved transaction plan that is ready to be sent to execution engine 316 for execution.

In this example, the charging phase begins when energy transaction execution engine 316 receives the transaction plan generated by energy transaction planner 310 and a request to begin charging the electric vehicle. Energy transaction execution engine 316 monitors and logs the health and safety of charging process 318 and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

The post-charge phase includes payment of the appropriate parties for the energy transaction in accordance with the energy transaction plan governing the transaction. Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase may also optionally include analysis of the completed energy transaction to provide incentives, redeem credits or benefits, and induce specific behaviors by one or more parties involved in the charging transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

During this charging phase, payment or fees for the charge are also recorded. Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

The embodiments recognize that third party vendors, such as store owners, mall owners, advertisers, or any other vendor may want to encourage principals to visit their facilities. For example, and without limitation, vendors may want to increase traffic to their stores, encourage principals to try new services and/or new products, stimulate sales with special offers, increase sales of higher priced goods and services, increase patronage by certain demographic groups and/or certain types of spenders, and/or increase the number of purchases made by each customer that visits the store. The vendors may have a store located near a charging station and/or own a charging station that is located on the store premises. The illustrative embodiments recognize that vendors may want to use the charging station as a lure to entice customers to enter the store and/or make additional purchases.

According to one embodiment of the present invention, a computer implemented method, apparatus, and computer program product is provided for automatically managing incentives associated with an electric vehicle charging transaction. Incentives are received from a set of sources to form received incentives, by an incentive service. Applicable incentives are selected from the received incentives based on an identification of an electric vehicle, a charging station, and a set of principals associated with the electric vehicle charging transaction, by the incentive service. A set of selected incentives is identified from the received incentives for utilization in the electric vehicle charging transaction. The set of selected incentives is sent to an energy transaction planner, wherein the energy transaction planner incorporates the set of selected incentives into an energy transaction plan that is used to control the electric vehicle charging transaction.

Figure 4:
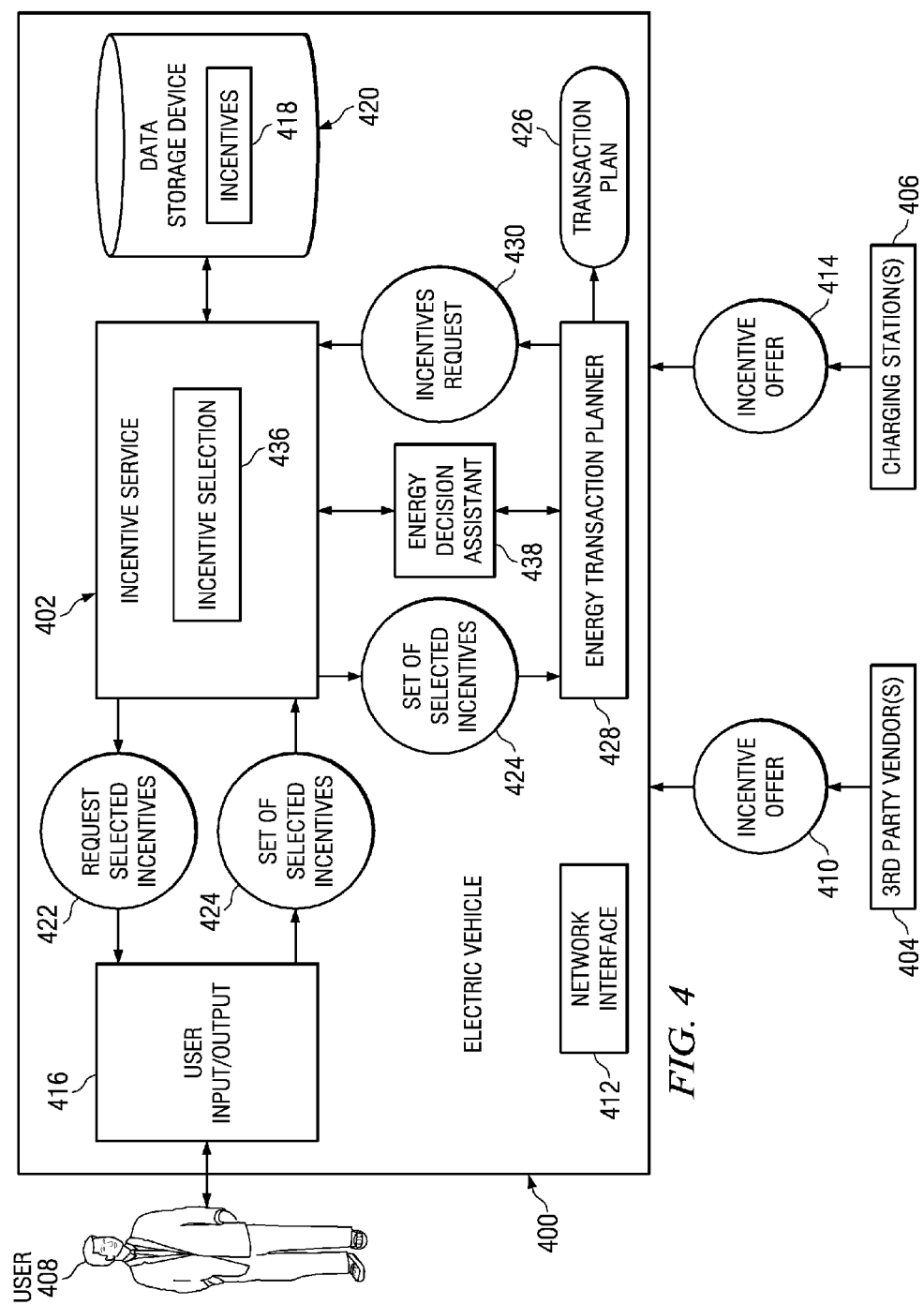
FIG. 4 is a block diagram of an incentive service for managing incentives associated with electric vehicle charging transactions in accordance with an illustrative embodiment.

Turning now to FIG. 4, a block diagram of an incentive service for managing incentives associated with electric vehicle charging transactions is shown in accordance with an illustrative embodiment. Electric vehicle 400 is an electric vehicle that relies in whole or in part on electricity to drive the vehicle, such as, without limitation, electric vehicle 116 in FIG. 1.

Incentive service 402 is a software component for managing incentives associated with an electric vehicle charging transaction. The incentives may be incentives that are applied to a current charging transaction to reduce the amount payable by a principal or increase the amount payable to the principal. The incentives may also be incentives that are awarded in the current charging transaction but are not applied to the current charging transaction. In such a case, the incentives may be applied to a future charging transaction, applied to the purchase of goods or services related to a charging transaction, and/or goods or services that are unrelated to charging transactions. Related goods or services may include a car wash, oil change, an air gauge, free parking, valet services, or other goods or services that are associated with electric vehicle 400. Unrelated items may include, without limitation, food, beverages, discounted movie tickets, restaurant gift certificates, or other incentives associated with goods and services unrelated to electric vehicle. The incentives may be provided by third party vendors 404 and/or the owner or operator of charging station 406. User 408 may also provide incentive information to incentive service 402.

Thus, incentive service 402 provides a way for third party vendors 404 to publicize incentives to vehicle principals. Third party vendors 404 may be parties unrelated to the charging transaction, such as a grocery store owner or third party vendors 404 may be energy provider principals, such as utilities and charging station owners and/or operators, to publicize incentives to the owner and/or operator of electric vehicle 400 to encourage the principals to behave in ways beneficial to the third party vendors and/or the principals offering the incentives.

For example, if a vendor, such as charging station 406 foresees a need for vehicles to be connected to the grid for energy discharge or storage during some window of time, such as during high energy usage, the vendor may provide incentives to vehicle principals to encourage principals to connect electric vehicles to the grid at specified locations. In another instance, a third party might provide incentives to owners or operators of charging station 406 to encourage them to filter those incentives indirectly to a vehicle principal and thereby achieve the primary goal of the third party with respect to the behavior of vehicle principals.

Thus, incentive service 402 may obtain one or more incentive offers, such as incentive offer 410, from third party vendor(s) 404. In such a case, incentive service 402 may receive the incentives from third party vendor(s) 404 using a network connection established by network interface 412. Network interface 412 is any type of network access software known or available for allowing electric vehicle 400 to access a network. Network interface 412 connects to a network connection, such as network 102 in FIG. 1. The network connection permits access to any type of network, such as a local area network (LAN), a wide area network (WAN), or the Internet. Incentive service 402 utilizes network interface 412 to send requests for incentives to remote principals associated with computing devices that are located off electric vehicle 400 and/or receive incentives sent by principals to electric vehicle 400. The incentives may be sent to incentive service 402 in response to a request for incentives and/or the incentives may be pushed to incentive service 402 in the absence of a request from incentives service 402 for the incentives.

Incentive service 402 may also obtain one or more incentives, such as incentive offer 414, from charging station 406, and incentive offers manually entered by user 408 at user input/output 416, such as input/output unit 212 in FIG. 2. User input/output 416 may be implemented in any type of user interface for receiving user input and providing output to the user, such as, without limitation, a graphical user interface, a command line interface, a menu driven interface, a keyboard, a mouse, a touch screen, a voice-recognition system, or any other type of input/output device. User input/output 416 formats the user input into a form that can be processed by incentive service 402. The incentives obtained from charging station 406, third party vendor(s) 404, user 408, and/or any other source of incentives are then stored as incentives 418 in a data storage component on electric vehicle 400, such as data storage device 420. Incentives 418 may be offers of price discounts, coupons for redemption on the current charging transaction or on a future charging transaction, coupons for other goods or services, rebates, free goods or services, reward prizes, reward points, cash back, entry in a contest or drawing, special rates, or any other type of incentive.

User input/output 416 may be used to display incentives 418 to user 416 and request selected incentives 422 to one or more principals, such as user 408, to request that the one or more principals select one or more incentives from incentives 418 to form set of selected incentives 424. Set of selected incentives 424 includes one or more incentives that will be applied to the charging transaction. User input/output 416 may be implemented as any type of device or means for communicating incentive offers. The one or more principals, such as user 416 may use user input/output 416 to select which incentives in incentives 418 to apply to a particular charging transaction to form set of selected incentives 424. The principals in the set of principals may also use a user input/output associated with a remote computing device, such as a server, a personal digital assistant (PDA), or a smart phone, to select incentives. In this case, the selected incentives in set of selected incentives 424 may be sent to incentive service 402 over a network connection via network interface 412.

Set of selected incentives 424 may include all the incentives in incentives 418, none of the incentives in incentives 418, or one or more incentives. In other words, set of selected incentives 424 may be an empty or null set, as well as containing one or more incentives to be used, applied, redeemed, or otherwise received in the current charging transaction. Set of selected incentives 424 is selected because two or more incentives in incentives 418 may not be redeemable in a single transaction. For example, if one incentive offers a twenty-five percent discount that is not redeemable with any other offer and another incentive offers five dollars off a charge purchase price of ten dollars or more that is not redeemable with any other offer, a choice will have to be made as to which incentive to apply because each incentive is not redeemable with any other offer. In another example, a user may not want to use any incentive under a current set of circumstances. For example, if the incentive is an offer of forty percent off the price of charging electric vehicle 400 and the principal is only going to partially charge the electric vehicle for fifteen minutes while the principal picks up a few groceries, the principal may choose to save the incentive for application when the principal is going to completely charge the electric vehicle to get the maximum benefit from the incentive.

Incentive service 402 sends set of selected incentives 424 selected by the set of principals to energy transaction planner 428 in response to receiving incentives request 428 from energy transaction planner 428. Energy transaction planner 428 generates transaction plan 426 to govern multiple aspects of the charging transaction in accordance with the preferences of the principals, the capabilities of the devices associated with electric vehicle 400, the capabilities of devices associated with charging station 406, the current state of devices associated with electric vehicle 400, the current state of devices associated with charging station 406, the contractual relationships of the parties. Energy transaction planner 428 also includes set of selected incentives 424 in transaction plan 426.

In another embodiment, incentive selection 436 automatically selects incentives from incentives 418 to form set of selected incentives without receiving incentive selections from a principal. In such a case, incentive selection 436 uses previously entered preference selections and a past history of incentive selections for the principal to identify which incentives in incentives 418 would be most likely to be selected by the principal. For example, if the user's preferences indicate a desire to maximize financial savings, incentive service 402 will select incentives that provide the most cost savings. In another example, if one incentive provides ten dollars off a total purchase and another incentive offers twenty five percent off, incentive service will select the offer of twenty-five percent off if the price of the charge will be greater than forty dollars to maximize the savings to the user. However, if the user's preferences indicate a desire to only charge electric vehicle 400 for a few minutes, incentive service 402 may select the offer of ten dollars off to maximize the savings. In this manner, set of selected incentives 424 to be used in transaction plan 426 are selected automatically by incentive service 402 dynamically in real time without input or intervention from a human user.

In another example, incentive selection 436 may identify incentives that are available to user 408 on a long term basis that user 408 always qualifies for. For example, and without limitation, an incentive may be an employee discount, a frequent customer discount, or a club membership discount. If user 408 is a member of a club that provides a discount on all charging transactions occurring at a particular charging station, incentive selection 436 may always select the club membership discount for application every time the user initiates a charging transaction at that charging station. User 408 may have indicated a desire to always use the club membership discount at this charging station and/or the history of incentive use for user 408 and/or electric vehicle 400 may show that user 408 always applies the club membership discount at this charging station. In such a case, incentive selection 436 may send the club membership discount information to energy transaction planner 428 in set of selected incentives 424 without requiring the express selection of the club membership discount incentive by user 408. Thus, the frequently used incentive may be selected and applied in charging transactions without requiring the user to make any express selections or provide any input to incentive service 402 or energy transaction planner 428.

In yet another embodiment, incentive service 402 may receive information from charging station 406 describing energy demands on a power supplier associated with charging station 406, such as an electricity grid. Energy transaction planner 428 generates transaction plan 426 based on the identified energy demands of the power supplier. For example, if the energy demands on the power supplier are high, charging station 406 may submit incentives to electric vehicle 400 that provide benefits to the owner and/or operator of electric vehicle 400 if electric vehicle 400 discharges electricity back into the electricity grid. In another example, if the energy demands on the power supplier are low, charging station 406 may push incentives to electric vehicle 400 that provide discounts for fully charging electric vehicle 400 with electricity at charging station 406 during the current time period in which energy demands are low. However, the incentives may be contingent on energy demands remaining low during the charging.

In another example, a third party may send a message directly or indirectly to a vehicle principal, such as user 408, with a financial or other offer, provided that the vehicle principal engages in and completes a charging transaction at a specified charging station and/or location, subject to terms and conditions, and/or possibly make one or more other related or unrelated purchases. The incentive may be a rebate, discount, validated parking, a store coupon, or any other discount. The message may be sent using email, text message, voice mail, popup on user input/output 416, signal sent to an energy decision assistant or any other means. If the vehicle principal accepts the offer and completes the required conditions, the incentive(s) are included as part of the financial exchanges of energy transaction planner 428 and/or may be resolved or redeemed by an energy transaction broker, such as energy transaction broker 314 in FIG. 3. The incentive(s) may be redeemable immediately by the vehicle principal, such as, and without limitation, validated parking or an in-store discount on proof of an ongoing charging transaction at charging station 406. One or more incentives may be redeemable in a different transaction in the future, such as if, without limitation, the incentive is a free movie ticket, a coupon for a restaurant, or a discount on the next charging transaction at charging station 406.

In one embodiment, energy transaction planner 438 may send incentives request 430 requesting set of selected incentives 424. In this example, user input/output 416 is an input/output device. However, incentive service 402 may utilize any type of device for communicating incentive offers, such as email, voice mail, text messages, popup audio, popup video, popup textual display on a vehicle console or a computer. The computer may be a desktop, a laptop, a personal digital assistant, a smart phone, or any other type of computing device.

In another embodiment, incentive service sends set of selected incentives 424 to an energy decision assistant 438 for processing. Energy decision assistant 438 may sort, filter, prioritize, re-format the electronic information describing the incentives so that energy transaction planner 428 can read and/or process the information, and/or otherwise process the incentives. Energy decision assistant 438 then sends set of selected incentives to energy transaction planner 428 for use in generating transaction plan 426.

Figure 5:
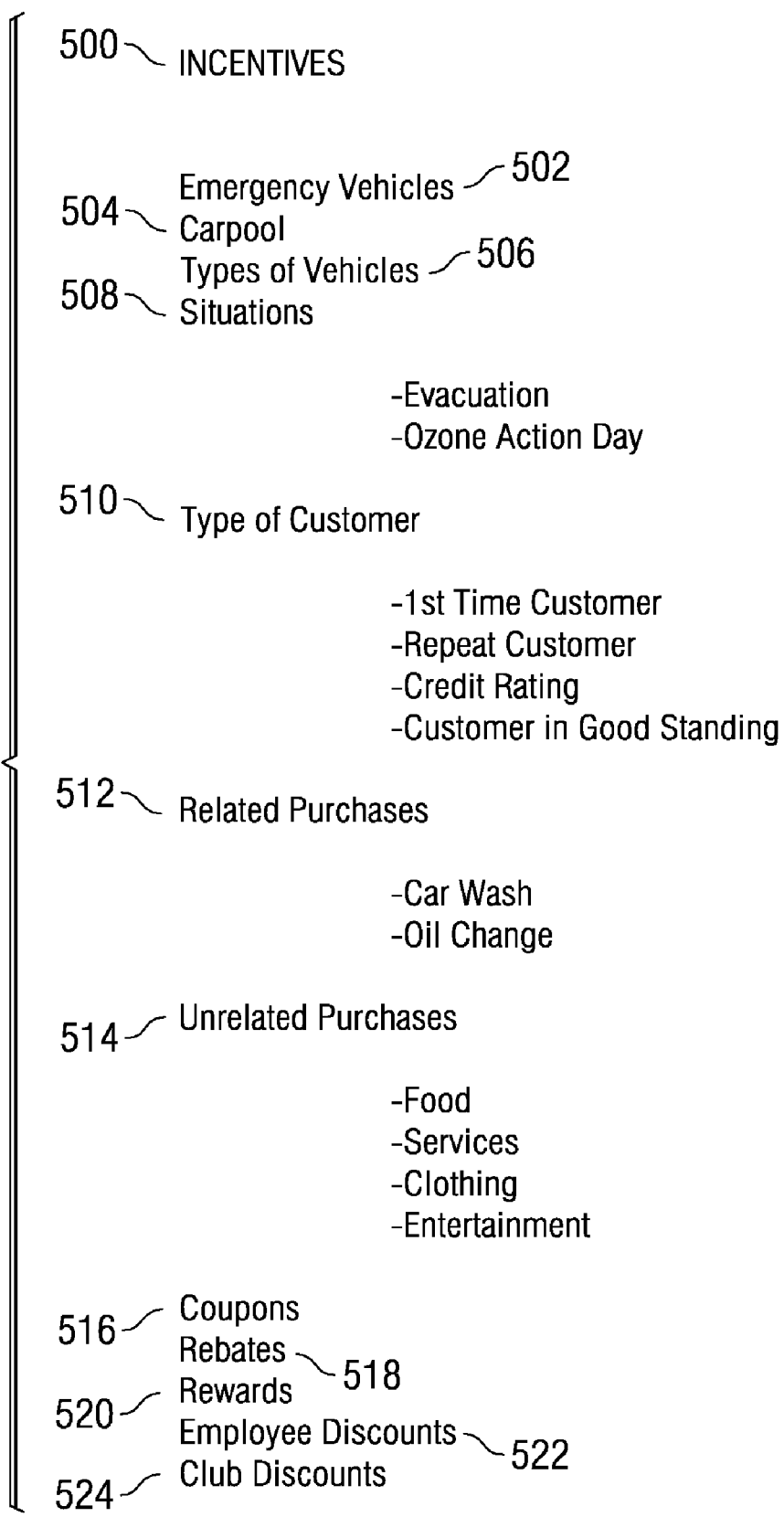
FIG. 5 is a block diagram illustrating types of incentives in accordance with an illustrative embodiment.

FIG. 5 is a block diagram illustrating types of incentives in accordance with an illustrative embodiment. Incentives 500 are incentives that may be applied to a current charging transaction to reduce the amount of payment paid by a principal or increase the amount of payment received by a principal. Incentives 500 may also include incentives that are applied to future charging transactions, and/or other related and unrelated goods and services transactions.

Emergency vehicles 502 are incentives that are applicable to emergency vehicles or other local, state, or federal government owned vehicles. Carpool 504 is an incentive that may be offered to carpool vehicles. For example, carpoolers may be provided with discounts on city parking for charging their all electric vehicles on ozone action days.

Types of vehicles 506 are incentives provided based on the type of vehicle that is being charged. For example, and without limitation, discounts on charging may be offered by a manufacturer of certain hybrid SUV's. In another example, discounts may be offered by a city government or by the charging station for all electric vehicle(s) that do not utilize any fuel source other than electricity. Situations 508 are incentives that may be applicable only in certain situations. For example, and without limitation, an incentive providing a discount for charging electric vehicles may be offered only on ozone action days or on days when an area is being evacuated due to flooding, wild fires, earthquakes, or other disasters.

Type of customer 510 is incentives that are offered based on the type of customer. For example, and without limitation, a discount may be offered to first time customers, repeat customers, customers having a higher credit rating, customers in good standing with the owner of the charging station, or other types of customers. Related purchases 512 are incentives offered for goods and/or services related to the electric vehicle, such as car wash, oil change, tires, parking, valet service, or other care related goods and services. Unrelated purchases 514 are incentives provided for goods and services unrelated to the electric vehicle that is being charged or discharged, such as food, beverages, discounts on entertainment, gift cards for clothing, movie tickets, discounts for sporting events, or other goods and services unrelated to the electric vehicle.

Coupons 516 are coupons that may be redeemed on the current charging transaction to reduce payments owed or coupons that are issued at the end of the charging transaction as a reward for charging that may be applied to future transactions. Rebates 518 are money rebates that may be applied to a manufacturer or other principal for money back. Rewards 520 may be any type of prize, gift, or points awarded to a principal. Employee discounts 522 are any discounts that are owed to the principal, such as employee discounts, senior citizen discounts, or other discounts. Club discounts 524 are discounts that are purchased or provided to a principal as a benefit of a club membership, such as American Automobile Association (AAA), or any other organization.

The incentive service may include a description or specification of the type of incentive and/or a form in which the incentive is defined and presented, such a coupon bar code, a PIN code, a discount promotional code, or other form.

Figure 6:
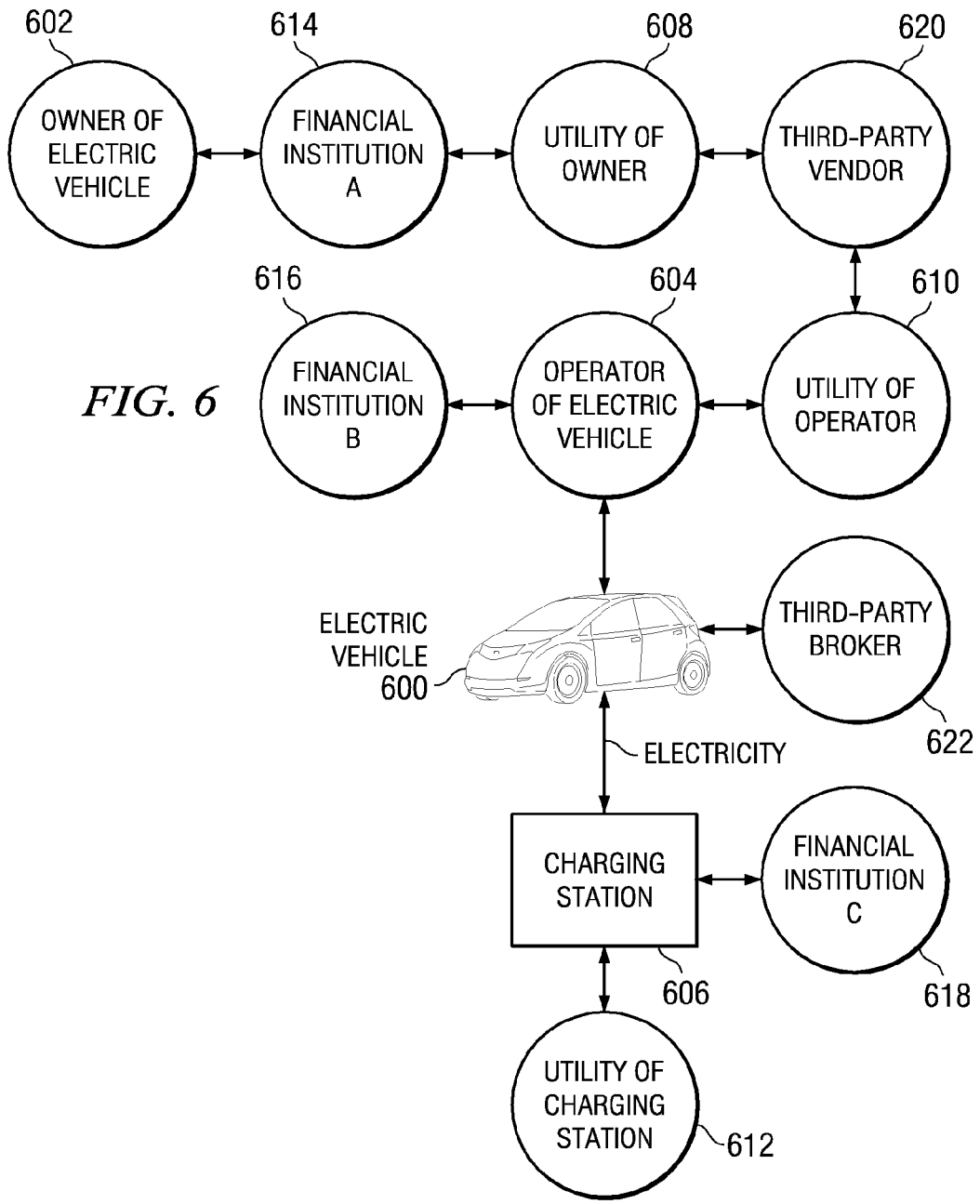
FIG. 6 is a block diagram of parties to an electric vehicle charging transaction in accordance with an illustrative embodiment.

Turning now to FIG. 6, a block diagram of parties to an electric vehicle charging transaction is depicted in accordance with an illustrative embodiment. Each party may have a set of preferences for charging the electric vehicle that is managed by the vehicle preference service. A principal is any entity that may have an interest or role in the energy transaction for charging an electric vehicle, including but not limited to, the vehicle operator, owner of the electric vehicle, the owner of the charging station, the operator of the charging station, financial institutions associated with one or more of the parties, utilities associated with one or more of the principals, or third parties having an interest in the charging transaction. FIG. 6 illustrates the different relationships between principals. Any one or more of the principals shown in FIG. 6 may have preferences stored in the on-vehicle preference service.

Electric vehicle 600 is a vehicle that relies in whole, or in part, on electric power to drive the vehicle, such as electric vehicle 118 in FIG. 1 or electric vehicle 400 in FIG. 4. Owner of electric vehicle 602 is a principal that creates a set of preferences in vehicle preference service on electric vehicle 600. Operator of electric vehicle 604 is a principal that may be the owner or someone that has borrowed electric vehicle 600. Each operator may optionally create their own set of preferences in the vehicle preference service on electric vehicle. Charging station 606 is a station or kiosk at which electric vehicle obtains charge or de-charges to provide electricity back to the electric grid, such as charging station 118 in FIG. 1 or charging station 434 in FIG. 4. Charging station 606 may also have a set of preferences for governing the charging of electric vehicle 600. Each party may have a utility associated with the party. A utility refers to a provider of electric power. A utility typically provides electric power to a charging station via an electric power grid. Each utility may also have preferences for governing the charging transaction. For example, utility of owner 608, utility of operator 610, and utility of charging station 612 may each be parties with an interest in the charging transaction and preferences for governing the charging of electric vehicle 600.

Each party may also have a financial institution for paying for the electricity purchased, or for being reimbursed for electricity provided back to the electric grid. A financial institution may be a bank, a credit card company, a broker, a lender, or any other financial institution. For example, financial institution A 614 may be associated with owner of electric vehicle 602, financial institution B 616 may be associated with operator of electric vehicle 604, and financial institution C 618 may be associated with charging station 606. Each of these financial institutions may have preferences for controlling how amounts due are received, how charges of payments are received and accepted, how credits are issued and received, and other aspects of financial transactions associated with charging electric vehicle 600.

Third party vendor 620 is a third party that is not associated with charging station 606 or electric vehicle 600. For example, and without limitation, third party vendor 620 may be a grocery store, a convenience store, a car wash, a repair shop, or any other type of vendor. Third party broker 622 is a third party that may provide financing or manage financial transactions associated with charging electric vehicle 600.

Each of the parties shown in FIG. 6 may optionally have preferences, constraints, limitations, or requirements associated with charging electric vehicle 600. The vehicle preference service on electric vehicle 600 may optionally store, manage, and retrieve some or all of these preferences, constraints, limitations, and requirements in data storage device on electric vehicle 600. The vehicle preference service retrieves the information of interest that is responsive to a request by an energy transaction planner and sends the preferences of interest to the energy transaction planner for use in generating a plan to govern the charging of electric vehicle 600 at charging station 606.

Figure 7:
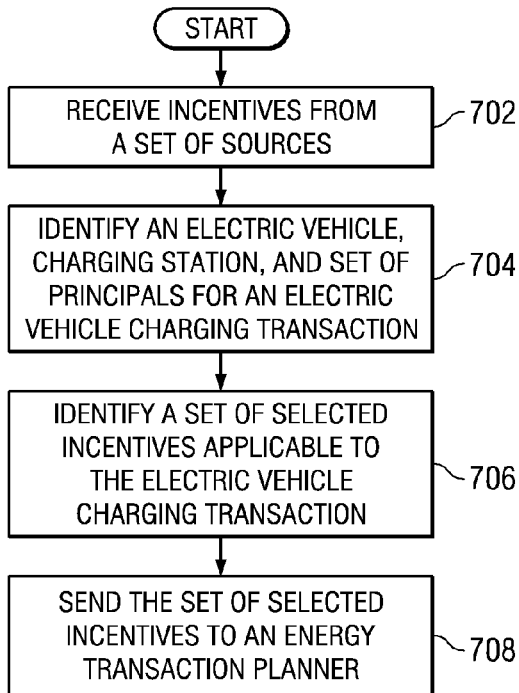
FIG. 7 is a flowchart illustrating a process for identifying selected incentives to a given electric vehicle charging transaction in accordance with an illustrative embodiment.

FIG. 7 is a flowchart illustrating a process for identifying selected incentives to a given electric vehicle charging transaction in accordance with an illustrative embodiment. The process in FIG. 7 may be implemented by software for managing incentives, such as incentive service 402 in FIG. 4.

The process begins by receiving incentives from a set of sources (step 702). The set of sources may be online sources, sources accessed via a network connection, or sources of incentives that are local to the incentive service. The set of sources may also include a user manually entering information describing an incentive offer using an input/output device. The incentive service identifies the electric vehicle, the charging station, and a set of principals for the electric vehicle charging transaction (step 704). The incentive service identifies a set of selected incentives applicable to the electric vehicle charging transaction (step 706). One or more incentives may be applicable based on the identification of the charging station, the type of electric vehicle, whether the customer is a first time customer or repeat customer, the date, the day of the week, the time of day, the current price of electricity, and other factors associated with a particular charging transaction. The incentive service then sends the set of selected incentives that are applicable to this charging transaction to an energy transaction planner for incorporation into the energy transaction plan (step 708) with the process terminating thereafter.

Figure 8:
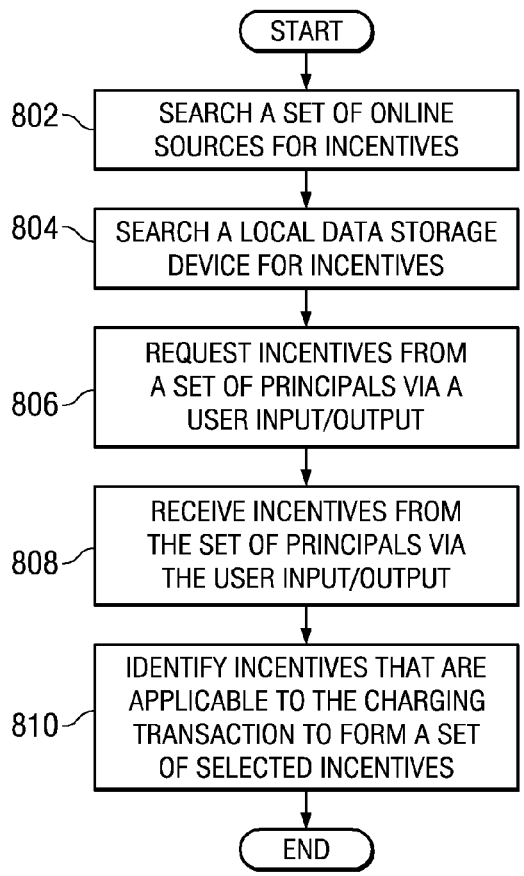
FIG. 8 is a flowchart illustrating a process for obtaining incentives from a set of sources in accordance with an illustrative embodiment.

FIG. 8 is a flowchart illustrating a process for obtaining incentives from a set of sources in accordance with an illustrative embodiment. The process in FIG. 8 may be implemented by software for managing incentives, such as incentive service 402 in FIG. 4.

The process begins by searching a set of online sources for incentives (step 802). Online sources are sources available over a network connection, such as from a web server, an email server, a network database, or any other online source. The incentive service searches a local data storage device for incentives (step 804). The local data storage device may be a data storage device located on the electric vehicle or a removable data storage device that is connected to the electric vehicle to access the incentives stored on the removable data storage device. A removable data storage device may be, without limitation, a flash memory, a memory stick, or any other type of removable device for storing data.

The incentive service requests incentives from a set of principals using an input/output device (step 806). The incentive service may request the incentives from the owner or operator of the charging station, a third party vendor, a utility, or any other principal. An owner or operator may also manually enter incentives into the input/output device that the owner or operator received in a paper mailer, magazine or newspaper advertisement, flyer, paper coupon, television or radio advertisement, or other non-electric format. The incentive service receives incentives from the set of principals via the input/output (step 808). The incentive service then identifies incentives that are applicable to the charging transaction to form a set of selected incentives (step 810) with the process terminating thereafter.

In this example, all the applicable incentives are applied to a particular charging transaction. However, a principal may choose to only use some or none or the applicable incentives. In such a case, the principal may select to view the applicable incentives and choose which incentives to utilize and which incentives to disregard.

Figure 9:
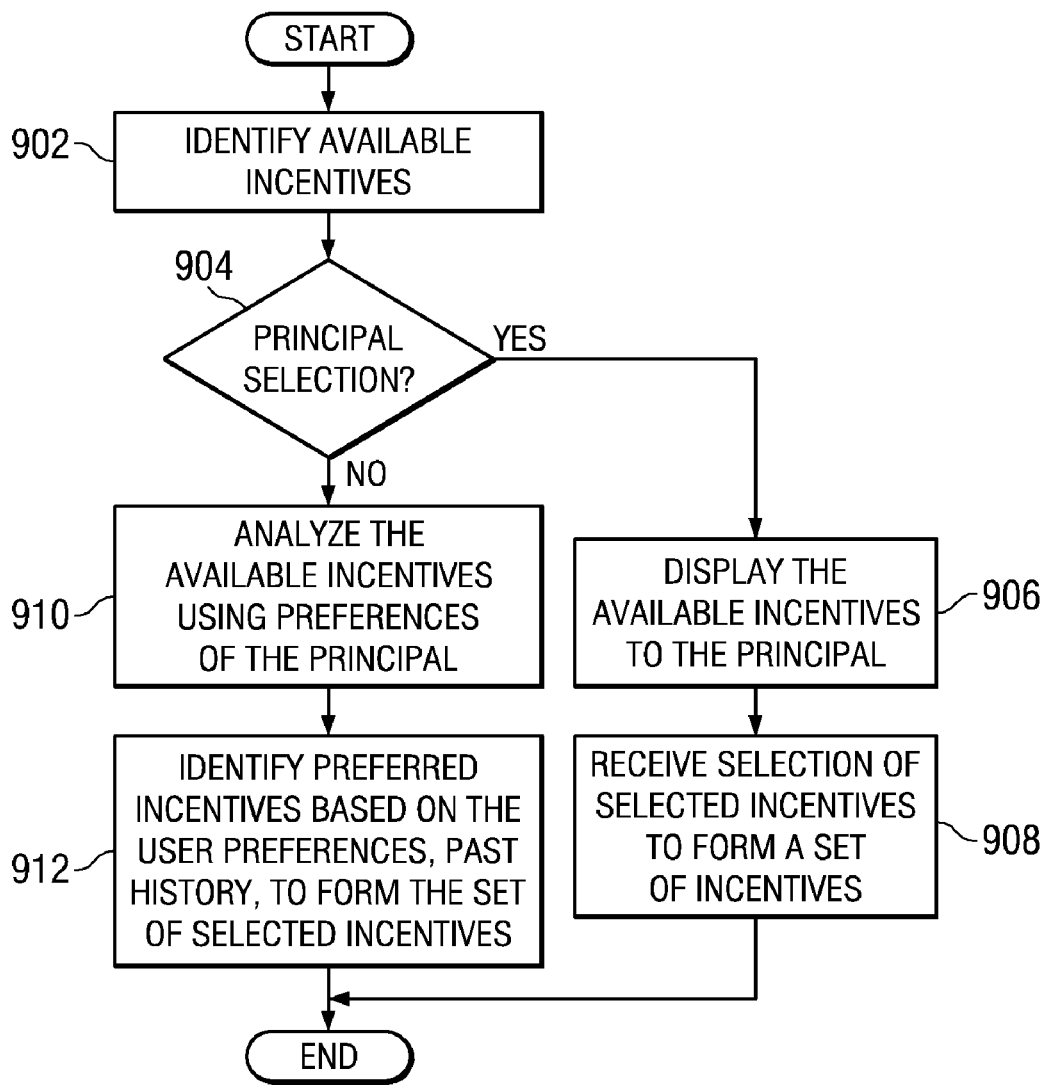
FIG. 9 is a flowchart illustrating a process for selecting incentives associated with a charging transaction in accordance with an illustrative embodiment.

FIG. 9 is a flowchart illustrating a process for selecting incentives associated with a charging transaction in accordance with an illustrative embodiment. The process in FIG. 9 may be implemented by software for managing incentives, such as incentive service 402 in FIG. 4.

The process begins by identifying available incentives for a particular charging transaction (step 902). The incentive service makes a determination as to whether a principal has chosen to select which incentives to utilize (step 904). If the principal has chosen to select incentives for utilization from the available incentives, the incentive service displays the available incentives to the principal (step 906). The incentives may be displayed as visual or graphical content, audio content, a combination of visual and audio content, raised content such as Braille that can be read by a blind person, or any other format. The incentive service receives a selection of one or more incentives to form a set of selected incentives (step 908) with the process terminating thereafter.

Returning to step 904, if a user does not choose to select the incentives to be utilized, the incentive service analyzes the available incentives using preferences of the principal (step 910). The incentive service identifies incentives that would be preferred by the principal based on the principal's preferences and past history of selected incentive offers to form the set of selected incentives (step 912) with the process terminating thereafter.

In this example, the incentive service uses the preferences and past history of incentive choices of a single principal. In another example, the incentive service may use the preferences and/or past history of two or more principals to identify the incentives that are most likely to be preferred by the two or more principals. For example, if the incentives include incentives for the owner of the electric vehicle to receive discounted maintenance in the future or incentives offering a discount on food items purchased in conjunction with charging the electric vehicle, the incentive service may consider the preferences of the owner in addition to the preferences of the operator in selecting which incentive to utilize.

According to one embodiment of the present invention, a computer implemented method, apparatus, and computer program product is provided for automatically managing incentives associated with an electric vehicle charging transaction. Incentives are received from a set of sources to form received incentives, by an incentive service. Applicable incentives are selected from the received incentives based on an identification of an electric vehicle, a charging station, and a set of principals associated with the electric vehicle charging transaction, by the incentive service. A set of selected incentives is identified from the received incentives for utilization in the electric vehicle charging transaction. The set of selected incentives is sent to an energy transaction planner, wherein the energy transaction planner incorporates the set of selected incentives into an energy transaction plan that is used to control the electric vehicle charging transaction.

The incentive service allows vendors to publish incentives to an electric vehicle principal that is validated and/or applied in the context of an energy transaction at a charging station in accordance with a transaction plan that manages the energy transaction. Vendors may push incentives to the incentive service in real time as the electric vehicle is in operation, during the charging transaction, and/or preparing to connect to a charging station to initiate a charging transaction. The incentive service may gather information describing incentives at any time prior to the charging transaction. For example, the incentive service may request and/or receive incentives hours, day, weeks, or even months prior to a charging transaction in which the incentives will be used. In this manner, the incentive service provide a convenient and efficient way to request, gather, store, manage, apply, and redeem incentives during electric vehicle charging transactions.

The incentive service permits vendors to publicize incentives to principals, redeem incentives in a current charging transaction, redeem incentives separate from the current charging transaction, and/or include incentives as part of an energy transaction plan that is used to control all aspects of the charging transaction. The incentives may be redeemed within the context of the charging transaction as part of the energy transaction broker service. The incentives may also be redeemed separately from the current charging transaction financial resolution as, for example, and without limitation, an in-store coupon, gift certificate, reward points that are redeemable upon accumulating a given number of points, or any other separate redemption of incentives.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of automatically managing incentives associated with an electric vehicle charging transaction, the computer implemented method comprising:
    determining, by a vendor, a particular period of time, wherein total usage of electricity supplied by an electrical power grid to all recipients of electricity connected to the power grid at a particular period of time is anticipated to be a particular amount during the particular period of time;
    providing, by the vendor, a particular incentive to encourage a vehicle principal to connect an electric vehicle to a changing station during the particular period of time;
    receiving incentives from a set of sources to form received incentives, by an incentive service, wherein the particular incentive is included in the received incentives;
    selecting applicable incentives from the received incentives based on an identification of the electric vehicle, the charging station, and a set of principals associated with a charging transaction for the electric vehicle, by the incentive service, wherein the vehicle principal is included in the set of principals;
    identifying a set of selected incentives from the received incentives for utilization in the charging transaction; and
    sending the set of selected incentives to an energy transaction planner, wherein the energy transaction planner incorporates the set of selected incentives into an energy transaction plan that is used to control the electric vehicle charging transaction.

2. The computer implemented method of claim 1 wherein identifying a set of selected incentives from the received incentives for utilization in the electric vehicle charging transaction further comprises:
    presenting the received incentives to a subset of principals in the set of principals with a request for a selection of incentives to be used in the electric vehicle charging transaction; and
    receiving input from the subset of principals identifying selected incentives from the received incentives to form the set of selected incentives, wherein incentives in the set of selected incentives are used in the charging transaction and incentives in the received incentives that are not included in the set of selected incentives are not used in the charging transaction.

3. The computer implemented method of claim 1 wherein identifying a set of selected incentives from the received incentives for utilization in the charging transaction for the electric vehicle further comprises:
  retrieving preferences for a subset of principals in the set of principals and a past history of incentive selections by the subset of principals; and
  analyzing the received incentives by the incentive service using the preferences and the past history to identify incentives that would be selected by the subset of principals to form the set of selected incentives, wherein the set of selected incentives are identified automatically by the incentive service identified automatically by the incentive service without an express selection of incentives by the subset of principals.

4. The computer implemented method of claim 1 wherein receiving incentives from a set of sources to form received incentives, by an incentive service further comprising:
  receiving information describing an incentive that is provided on a non-electronic format, wherein the information is entered manually by a user at a user input/output interface to form an electronic incentive offer; and
  sending the electronic incentive offer to the incentive service to form the received incentives.

5. The computer implemented method of claim 1 wherein receiving incentives from a set of sources to form received incentives, by an incentive service further comprising:
  receiving information describing an incentive from an electronic source in an electronic format.

6. The computer implemented method of claim 1 wherein the electronic source is selected from the group consisting of an email server, a web server, a data storage device, and a text message server.

7. The computer implemented method of claim 1 wherein the particular amount of electricity supplied by the electrical power grid is anticipated to be a peak amount of electricity.

8. The computer implemented method of claim 1 wherein an incentive is selected from a group consisting of a coupon, a rebate, a benefit, a reward, a gift card, cash back, and a discount.

9. The computer implemented method of claim 1 further comprising:
  discharging, from the electric vehicle, electricity stored in the electric vehicle when the electric vehicle is connected to the charging station, wherein the electric vehicle supplies the electricity discharged from the electric vehicle to the power grid.

10. A computer program product comprising:
  a non-transitory computer usable medium including computer usable program code for automatically managing incentives associated with an electric vehicle charging transaction, said computer program product comprising:
  computer usable program code for determining, by a vendor, a particular period of time, wherein total usage of electricity supplied by an electrical power grid to all recipients of electricity connected to the power grid at a particular period of time is anticipated to be a particular amount during the particular period of time;
  computer usable program code for providing, by the vendor, a particular incentive to encourage a vehicle principal to connect an electric vehicle to a changing station during the particular period of time;
  computer usable program code for receiving incentives from a set of sources to form received incentives, by an incentive service, wherein the particular incentive is included in the received incentives;
  computer usable program code for selecting applicable incentives from the received incentives based on an identification of the electric vehicle, the charging station, and a set of principals associated with an charging transaction for the electric vehicle, by the incentive service, wherein the vehicle principal is included in the set of principals;
  computer usable program code for identifying a set of selected incentives from the received incentives for utilization in the charging transaction; and
  computer usable program code for sending the set of selected incentives to an energy transaction planner, wherein the energy transaction planner incorporates the set of selected incentives into an energy transaction plan that is used to control the electric vehicle charging transaction.

11. The computer program product of claim 10 wherein identifying a set of selected incentives from the received incentives for utilization in the electric vehicle charging transaction further comprises:
  computer usable program code for presenting the received incentives to a subset of principals in the set of principals with a request for a selection of incentives to be used in the electric vehicle charging transaction; and
  computer usable program code for receiving input from the subset of principals identifying selected incentives from the received incentives to form the set of selected incentives, wherein incentives in the set of selected incentives are used in the charging transaction and incentives in the received incentives that are not included in the set of selected incentives are not used in the charging transaction.

12. The computer program product of claim 10 wherein identifying a set of selected incentives from the received incentives for utilization in the charging transaction for the electric vehicle further comprises:
  computer usable program code for retrieving preferences for a subset of principals in the set of principals and a past history of incentive selections by the subset of principals; and
  computer usable program code for analyzing the received incentives by the incentive service using the preferences and the past history to identify incentives that would be selected by the subset of principals to form the set of selected incentives, wherein the set of selected incentives are identified automatically by the incentive service without an express selection of incentives by the subset of principals.

13. The computer program product of claim 10 wherein receiving incentives from a set of sources to form received incentives, by an incentive service further comprising:
  computer usable program code for receiving information describing an incentive that is provided on a non-electronic format, wherein the information is entered manually by a user at a user input/output interface to form an electronic incentive offer; and
  computer usable program code for sending the electronic incentive offer to the incentive service to form the received incentives.

14. The computer program product of claim 10 wherein receiving incentives from a set of sources to form received incentives, by an incentive service further comprising:
  computer usable program code for receiving information describing an incentive from an electronic source in an electronic format.

15. The computer program product of claim 10 wherein the electronic source is selected from the group consisting of an email server, a web server, a data storage device, and a text message server.

16. The computer program product of claim 10 wherein the particular amount of electricity supplied by the electrical power grid is anticipated to be a peak amount of electricity.

17. The computer program product of claim 10 wherein an incentive is selected from a group consisting of a coupon, a rebate, a reward, a gift card, cash back, and a discount.

18. The computer program product of claim 10 further comprising:
   computer usable program code for discharging, from the electric vehicle, electricity stored in the electric vehicle when the electric vehicle is connected to the charging station, wherein the electric vehicle supplies the electricity discharged from the electric vehicle to the power grid.

19. An apparatus comprising:
   a bus system;
   a communications system coupled to the bus system;
   a memory connected to the bus system, wherein the memory includes computer usable program code; and
   a processing unit coupled to the bus system, wherein the processing unit executes the computer usable program code to determine, by a vendor, a particular period of time, wherein total usage of electricity supplied by an electrical power grid to all recipients of electricity connected to the power grid at a particular period of time is anticipated to be a particular amount during the particular period of time; provide, by the vendor, a particular incentive to encourage a vehicle principal to connect an electric vehicle to a changing station during the particular period of time; receive incentives from a set of sources to form received incentives, by an incentive service, wherein the particular incentive is included in the received incentives; select applicable incentives from the received incentives based on an identification of the electric vehicle, the charging station, and a set of principals associated with a charging transaction for the electric vehicle, by the incentive service, wherein the vehicle principal is included in the set of principals; identify a set of selected incentives from the received incentives for utilization in the charging transaction; and send the set of selected incentives to an energy transaction planner, wherein the energy transaction planner incorporates the set of selected incentives into an energy transaction plan that is used to control the charging transaction for the electric vehicle.

20. A data processing system comprising:
   a vendor determining a particular period of time, wherein total usage of electricity supplied by an electrical power grid to all recipients of electricity connected to the power grid at a particular period of time is anticipated to be a particular amount during the particular period of time;
   the vendor providing a particular incentive to encourage a vehicle principal to connect an electric vehicle to a changing station during the particular period of time;
   an incentive service, wherein the incentive service receives incentives from a set of sources to form received incentives, by an incentive service, wherein the particular incentive is included in the received incentives; selects applicable incentives from the received incentives based on an identification of electric vehicle, charging station, and a set of principals associated with a charging transaction for the electric vehicle, by the incentive service, wherein the vehicle principal is included in the set of principals; and wherein the incentive service further comprises:
   an incentive selection component, wherein the incentive selection component identifies a set of selected incentives from the received incentives for utilization in the charging transaction, wherein the set of selected incentives are incorporated into an energy transaction plan that is used to control the electric vehicle charging transaction and resolve financial obligations of a set of principals.

* * * * *